United States Patent [19]

Skorka

[11] Patent Number: 4,726,747
[45] Date of Patent: Feb. 23, 1988

[54] THRUST PISTON PUMP FOR ACTIVE SUBSTANCE DISPENSER

[75] Inventor: Thomas Skorka, Radolfzell, Fed. Rep. of Germany

[73] Assignee: Ing. Erich Pfeiffer GmbH & Co. KG, Fed. Rep. of Germany

[21] Appl. No.: 806,280

[22] Filed: Dec. 6, 1985

[30] Foreign Application Priority Data

Dec. 14, 1984 [DE] Fed. Rep. of Germany ....... 3445562

[51] Int. Cl.$^4$ .............................................. G01F 11/02
[52] U.S. Cl. .................... 417/489; 222/321; 222/383
[58] Field of Search ................. 222/321, 383; 417/489

[56] References Cited

U.S. PATENT DOCUMENTS

| 2,169,209 | 8/1939 | Anderson | 222/321 |
| 4,010,874 | 3/1977 | Steiman | 222/321 |
| 4,022,354 | 5/1977 | Kotuby | 222/321 |
| 4,051,983 | 10/1977 | Anderson | 222/321 |
| 4,277,001 | 7/1981 | Nozawa | 222/321 |
| 4,371,097 | 2/1983 | O'Neill | 222/321 |
| 4,511,069 | 4/1985 | Kalat | 222/321 X |

FOREIGN PATENT DOCUMENTS

| 2712383 | 9/1978 | Fed. Rep. of Germany . |
| 2749644 | 11/1978 | Fed. Rep. of Germany . |
| 2902624 | 7/1980 | Fed. Rep. of Germany . |
| 2900051 | 7/1980 | Fed. Rep. of Germany . |
| 7707644 | 6/1985 | Fed. Rep. of Germany . |

Primary Examiner—Carlton R. Croyle
Assistant Examiner—Theodore W. Olds

[57] ABSTRACT

A thrust piston pump for an active substance dispenser has two equiaxial, position-rigid, interconnected pistons running in the same direction, namely a pump piston passing in and out of an otherwise closed pump chamber and a larger presuction piston located downstream thereof, in whose associated pressure chamber is located the pump chamber end opened by the passing out of the pump piston. This leads to a very accurate dosing of the discharged active substance quantity, accompanied by a simple construction and high operational reliability.

31 Claims, 4 Drawing Figures

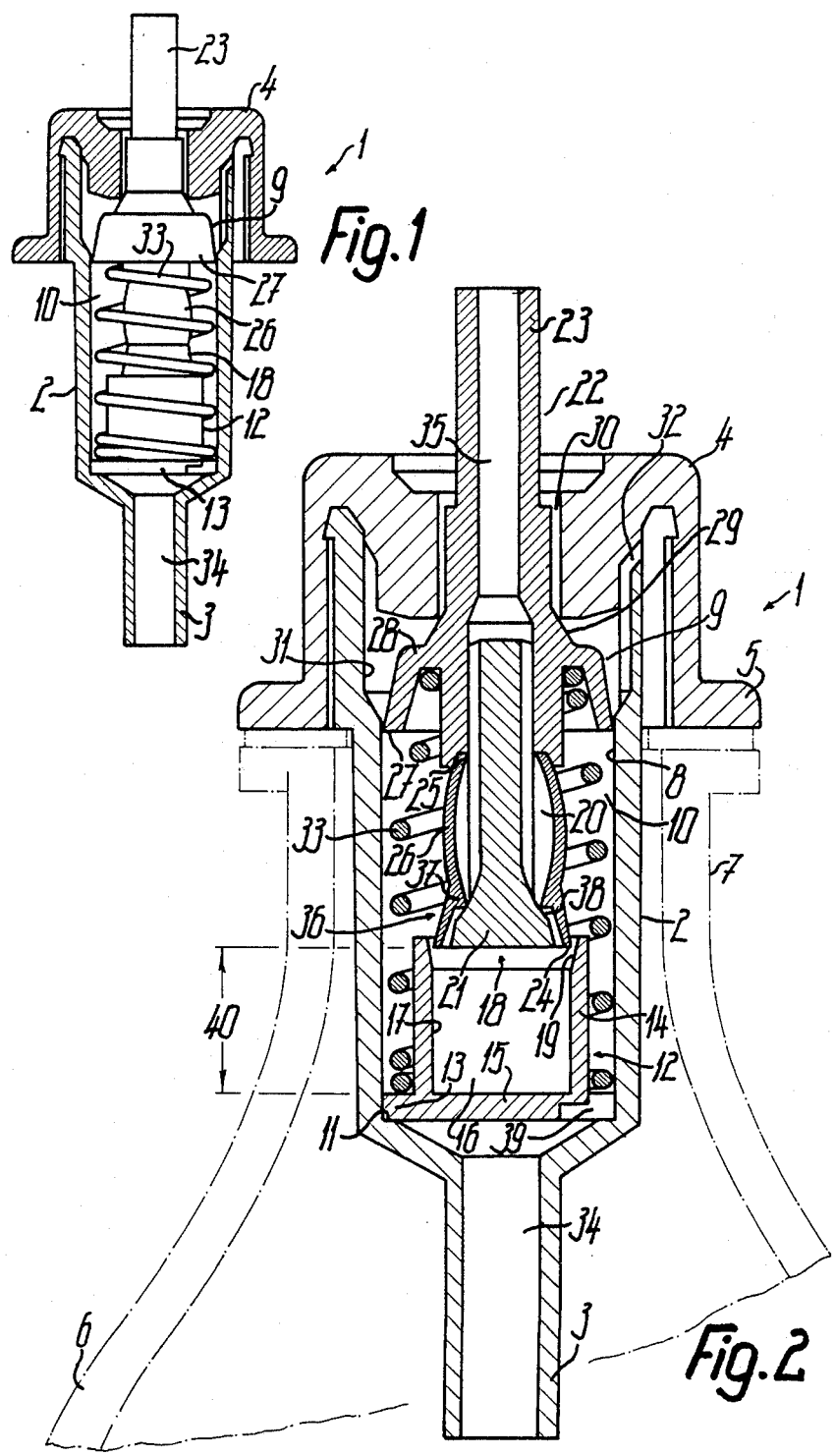

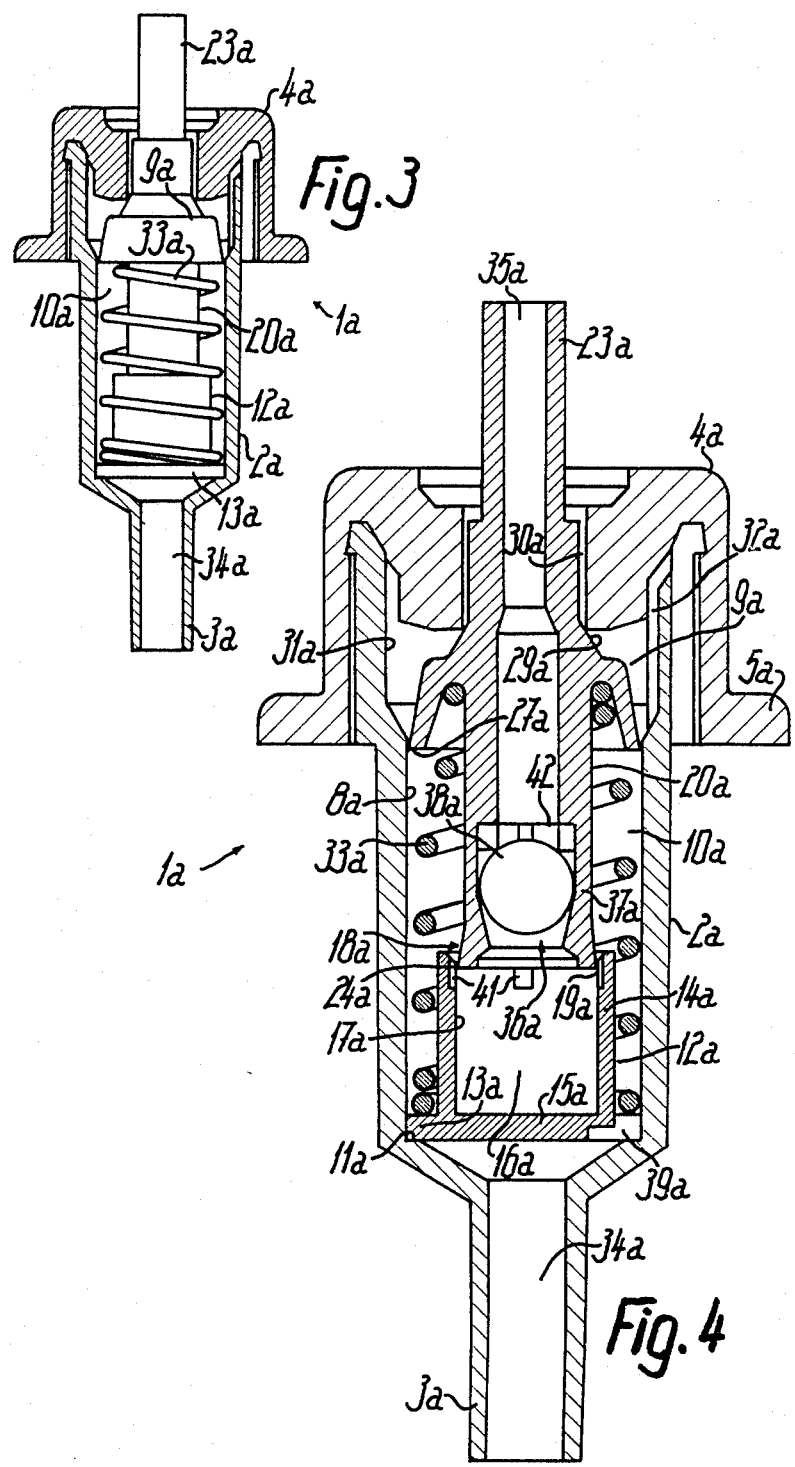

THRUST PISTON PUMP FOR ACTIVE SUBSTANCE DISPENSER

BACKGROUND OF THE INVENTION

The invention relates to a thrust piston pump for an active substance dispenser for the reproducible discharge more particularly of pharmaceutical products and the like, with a pump piston guided in a pump cylinder from a starting position via a pump stroke, the associated pump chamber of the piston being connected on the one hand to a suction duct arranged in an active substance reservoir for the suction of active substance and on the other hand to a discharge duct and with which is associated a second piston moving therewith and whose associated pressure chamber is connected to a duct, the latter being closable by a valve opening in differential pressure-dependent manner.

In a thrust piston pump known from a German Austigiselift No. 1 290 043, the second piston in the form of a control piston which is smaller than the pump piston and therefore is in advance during the piston stroke, serves to open a delivery valve provided on the pump piston after covering a predetermined pump stroke distance. However, at the instant of opening of this delivery valve the overpressure in the pump chamber, which is in any case smaller than a pump chamber which does not increase in size with the pump stroke and which keeps the control piston in the valve-opening position suddenly drops, so that the delivery valve is immediately closed again and cannot ensure an adequate active substance discharge. Moreover, in this arrangement, apart from the delivery valve, it is also necessary to have a valve opening on the inlet side in the feed direction, so that a relatively complicated pump construction is obtained.

SUMMARY OF THE INVENTION

The problem of the invention is to provide a thrust piston pump of the aforementioned type which, in the case of simple construction, ensures a high reliability of the refilling of the pump chamber during each pump cycle and a complete discharge of the active substance quantity corresponding to the pump stroke.

According to the invention this problem is solved by a thrust piston pump of the aforementioned type in that the pump chamber on the inlet side is exclusively opened during a short portion of the piston stroke to the suction duct following on to the starting position and that the second piston is in the form of a presuction piston, whose associated pressure chamber is open to the duct leading to the reservoir via the pump stroke. Thus, the active substance in the pump chamber can only escape in one direction, namely through the discharge duct during the actual pump stroke shortened by the portion following on to the starting position, because no separate suction side valve is required for the pump chamber and consequently the leakage and pressure losses linked with such a valve are prevented. Furthermore, the construction according to the invention ensures that during the return stroke in the pump chamber, the pump piston initially builds up a high vacuum, after which the pump chamber is only open over the last portion of the return stroke to the suction duct following on to the starting position, so that the active substance is suddenly sucked into the pump chamber for refilling the same. As the presuction piston is open over the pump stroke, i.e. appropriately also over the return stroke towards the reservoir, it ensures a presuction of the active substance, which further improves the refilling of the pump chamber.

According to another feature of the invention, the presuction piston runs in the same direction as the pump piston, so that it can be operated by a very simple mechanical connection to the pump piston. It is also advantageous for simplifying the construction of the pump if the pressure chamber is so arranged with the pump chamber that both chambers are simultaneously placed under an overpressure during the piston stroke. Thus, the presuction piston and the pump piston can be arranged in simple manner on a common piston shaft containing the discharge duct.

A particularly advantageous further development of the invention is obtained in that in the starting position, the pump piston opens in the manner of a slide control due to the associated and in particular conically widened and/or longitudinally slotted end of the otherwise preferably all-sided closed pump chamber and that preferably at least this end of the pump chamber is located in the pressure chamber and is connected by the same to the suction duct. This leads to a particularly reliable and rapid refilling of the pump chamber during each pump cycle.

For further simplifying the construction of the pump, the pump chamber is formed by a cup-shaped chamber body, which is preferably located entirely in the pressure chamber and/or is equiaxial with respect thereto and particularly as a separate part is aligned in position-fixed manner on the inner face of the pressure chamber. The chamber body, which with respect to its circumferential casing and its base wall is appropriately completely closed, permits a very precise determination of the discharge volume discharged per pump stroke. It can be arranged in space-saving manner completely within the pressure chamber and as a separate part offers the possibility for pumps, which are constructed identically with respect to their remaining components, can be adapted to different requirements by the choice of different chamber bodies and optionally different pump pistons.

According to a further simplified embodiment of the invention, the duct leading from the pressure chamber to the reservoir is formed by the suction duct, so that no separate duct is required.

Particularly favourable pressure conditions both for the initial filling of the pump when it is first put into use and for each refilling during the pump cycles are obtained if the presuction piston has a larger piston cross-section than the pump piston. This makes it possible in a constructionally simple manner to arrange the chamber body with wall clearance in the pressure chamber and to support the same with an annular flange projecting over its circumference and in particular located in the plane of its base and which has at least one passage opening, in the vicinity of an inner shoulder of the pressure chamber.

According to a further development of the invention, the presuction piston and the pump piston are successively located in a pump casing, which surrounds the pressure chamber, passes at one end into the suction duct and closed at the other end by a casing or spring cap traversed by the piston shaft. Preferably the pump piston is closer to the suction duct than the presuction piston. In the case of such a construction, the pump can be made axially very short.

Preferably the suction piston and pump piston are spring-loaded towards the starting position by a single common return spring, which is in particular supported on the presuction piston, the return spring preferably surrounding the chamber body in the form of a helical compression spring or the like, so that through the relatively long construction of this spring a flat spring load deflection curve is obtained over the entire pump stroke. The return spring also keeps the chamber body in simple manner and without any additional fastening means in its fitted position in that the return spring presses the chamber body against a support and consequently simultaneously finds its associated abutment.

A particularly advantageous further development of the invention is obtained in that the valve is constructed as a pressure relief valve associated with the discharge duct and is preferably positioned in the vicinity of the pump piston.

As a result of the construction according to the invention, only a single valve is required, on whose valve closing face no very high precision requirements are made, without loss of operational reliability, as compared with a check valve. As a result of the inventive construction, there is also no mechanical opening of the delivery valve, whose opening phase determining the quantity of active substance discharged is generally dependent on whether or not in the final portion of the pump stroke the residual travel required for valve opening against the then stronger rising spring tension is performed. However, it is dependent on this whether the dosing quantity defined by the pump chamber is completely discharged, i.e. whether or not the desired dosing is accurate.

It is also advantageously possible to produce the valve from a very small number of parts. For example one of the two valve parts movable against one another can be formed by a portion of the piston. The pump piston preferably has a compression sleeve forming in the vicinity of one end the associated piston packing lip, limiting the discharge duct in its area on the outer circumference and mounted on the piston shaft in the vicinity of the other end. This sleeve forms on the inner circumference an annular valve closing part, with which is associated a valve seat on the piston shaft. Thus, in this case the movable valve part is formed by the pump piston or by the lip-type piston packing, so that no separate part is required for the valve construction. However, it is also possible to construct the valve as a hose valve, which is preferably formed by an elastic piston shaft portion surrounding a valve body, such as a ball with pretension, so that for forming the valve it is only necessary to have one additional component, e.g. a simple ball.

Further important simplifications in the construction of the inventive pump can be obtained in that the presuction piston and/or at least one piston and the piston shaft are constructed in one part, preferably from a rubber-elastic plastic. The complete piston arrangement of the pump and valve can consequently be made from two and at the most three components.

BRIEF DESCRIPTION OF THE DRAWINGS

The invention is described in greater detail hereinafter relative to non-limitative embodiments and the attached drawings, wherein show:

FIG. 1: The thrust piston pump according to the invention in the case of a pump casing open in axial section.

FIG. 2: The pump according to FIG. 1 on a larger scale and in axial section.

FIGS. 3 and 4: A further embodiment in representations corresponding to FIGS. 1 and 2.

DETAILED DESCRIPTION OF THE PREFERRED EMBODIMENTS

Thrust piston pump 1 according to FIGS. 1 and 2 has a substantially axially symmetrical pump casing 2, which on the inner end to be inserted in an active substance reservoir passes into a connection piece 3, which is narrowed with respect to its external diameter, for the connection to a suction or rising pipe not shown and at the other, widened end is closed by a casing or spring cap 4, which has an annular flange 5 for the sealed fixing to the neck 7 of an active substance reservoir 6 indicated in dot-dash manner.

The inner face of pump casing 2 forms a piston path 8 for a presuction piston 9 and surrounds the pressure chamber 10 belonging to said piston 9. On an annular shoulder-like, inner face 11 of the pump casing 2 provided at the transistion of pump casing 2 into the connection piece 3 is provided a substantially cylindrical chamber body 12 with an annular flange 13, whose external diameter corresponds to the internal diameter of pump casing 2 in the vicinity of inner face 11, the inner wall of pump casing 2 passing through to the inner face 11 with the diameter of the piston path 8. The cup-shaped chamber body 12, which can also advantageously be constructed in one piece with the pump casing 2, has a substantially cylindrical circumferential casing 14 and a planar bottom wall 15 located in the plane of the annular flange 13 and is centred equiaxially to the pressure chamber 10 by the circumference of annular flange 13. Circumferential casing 14 and bottom wall 15 define a cylindrical pump chamber 16, whose diameter is roughly the same as its axial extension. The wall surface of pressure chamber 16 up to the inner face of bottom wall 15 forms a piston path 17 for a pump piston 18, which is connected equiaxially and in position-rigid manner to the presuction piston 9 and is also displaced with respect to the latter by less than its external diameter to the connection piece 3. At its end 19 remote from the closed end of pump chamber 16, the piston path 17 is widened in acute-angled conical manner to a diameter located in the associated end face of casing 14 and which is slightly larger than the largest external diameter of pump piston 18, so that during the pump stroke it is in contact with the piston path 17 over roughly half the length of said end 19. The length of end 19 only corresponds to approximately one quarter of the length of the remaining path 17.

The pump piston 18 is formed by a central, shaft-like or plunger-like core part 21 of a two-part piston shaft 20 located in the axes of both pistons. The other tubular shaft part 22 is constructed in one piece with the presuction piston 9. The end wall of the casing cap 4 passes through the pump axis and projects over the outside of cap 4 with a discharge connection 23. The external diameter-increased end of core part 21 is surrounded by a ring-like or sleeve-like piston packing lip 24 with a clearance, which projects freely towards the closed end wall of pump chamber 16 and is conically widened in acute-angled manner, being radially and/or axially supported on the outer circumference of core part 21 in the vicinity of its rear end. The terminal edge of packing lip 24 intended for the engagement of pump piston 18 on path 17 is located in the plane of the free end face of core part 21. Packing lip 24 is formed by the associated end of a rubber-elastic compression sleeve 26 which bulges in the stretched rest position between the rear end of packing lip 24 and its other end 25, which is remote from packing lip 24 and fixed in pressure-type manner between the associated end of shaft part 22 and core part 21 engaging in centred manner in said end with its end portion remote from pump piston 18.

Presuction piston 9 is formed by a sleeve-like piston packing lip 27 widened conically in acute-angled manner in the same direction as packing lip 24 and whose end remote from pump chamber 16 passes via a ring-like end wall 28 in one piece into the associated portion of shaft part 22 of piston shaft 20 and in its initial position is close to the sleeve-like end wall of spring cap 4 projecting into pump casing 2. Following on to end wall 28, the external diameter of piston shaft 20 is tapered conically outwards, so that said conical portion 29 in the initial position sealingly engages on the inner terminal edge of the passage opening 30 for piston shaft 20 provided in cap 4. The inner end of shaft part 22, with respect to the pump piston 18 projects slightly further forward than the packing lip 27. In the starting position packing lip 27 engages on the associated end of path 8 remote from pump chamber 16 and which directly behind said bearing point passes via a sloping annular shoulder into a widened portion 31 of the inner face of pump casing 2, in which engages the spring cap 4. The space defined by presuction piston 9, portion 31 and spring cap 4 can be ventilated or vented via the annular clearance between passage opening 30 and piston shaft 20 and/or by a ventilating duct 32 provided in the wall of pump casing 2.

Towards the starting position, the two position-rigid, interconnected pistons are loaded by a return spring 33 in the form of a helical spring, which engages with pretension at one side within the packing lip 27 on the inner face of end wall 28 of presuction piston 9 and with its other side on the end face of the annular flange 13 remote from the inner face 11. In the vicinity of the annular clearance between circumferential casing 14 of chamber body 12 and pump casing 2, the return spring 33 equiaxial to the pump surrounds the chamber body 12 and in the connected zone surrounds the compression sleeve 26.

Connection piece 3 defines a suction duct 34, whilst piston shaft 20 with packing lip 24 and compression sleeve 26 defines a discharge duct 35. The discharge duct is formed in the vicinity of core part 21 in that the latter is provided behind the support of packing lip 24 with longitudinal grooves on its outer circumference and extending to the end located in shaft part 22. Upstream of the support of packing lip 24 on the outer circumference of core part 21, the discharge duct is formed by the annular clearance between lip 24 and part 21.

In the thus constructed discharge duct 35 is arranged a valve 36 in the form of a pressure relief valve opening in pump chamber 16 in the case of a corresponding overpressure and whose valve closing part 37 performing the opening and closing movement is formed by that zone of packing lip 24 or compression sleeve 26 which supports lip 24 on the outer circumference of core part 21. The associated valve seat 38 is formed by the circumferential surface of the piston shaft or core part 21 conically widened towards the free end in this area. The valve closing part 37 is substantially formed by a packing lip projecting radially inwards over the packing lip 24 or compression sleeve 26 and whose annular flank located towards the free end of the pump piston 18 is appropriately at right angles to the piston axis, whereas the other flank is conically tapered in acute-angled manner to the free end of pump piston 18 and preferably forms a continuous extension of the bulging inner face of the compression sleeve 26. Valve closing part 27 is pressed with a predetermined closing pressure resiliently against the valve seat 38 by the pretension of compression sleeve 26 tending towards the stretched position.

Annular flange 13 of chamber body 12 is provided with at least one passage opening 39 constantly connecting the pressure chamber 10 to suction duct 34, i.e. in valve-free manner. If the pistons are pressed inwards during the piston travel counter to the tension of return spring 33, then the packing lip 24 closes pump chamber 16 in pressure-tight manner after a short travel distance by running on to the end 19 of path 17 and during the further course of the pump travel indicated at 40 builds up the pressure in pump chamber 16. After a given portion of pump travel or stroke 40 the predetermined opening pressure of valve 36 is reached, so that it opens suddenly with falling spring load deflection curve of compression spring 26 and under the overpressure and the remainder of the pump stroke performed by pump piston 18 substantially the entire active substance quantity enclosed in pump chamber 16 is discharged through discharge duct 35. In the end position, packing lip 24 and/or piston shaft 20 engage with their associated end faces on the inner face of bottom wall 15, without in this position lip 24 preventing valve 36 from closing under the resiliency of compression sleeve 26. Presuction piston 9 moves simultaneously with the pump stroke and with the same piston path into pressure chamber 10, so that by means of the suction duct 24 the pressure is increased in reservoir 6. During the return stroke, due to the pump chamber 16 which is closed on all sides, a high vacuum is built up in the latter, whilst the presuction piston 9 sucks active substance from reservoir 6 into pressure chamber 10 via suction duct 34 and passage opening 39, in such a way that the still closed pump chamber 16 is flooded by active substance. At the end of the return stroke pump piston 18, by raising the packing lip 24 from path 17, opens the open end of chamber body 12, so that the active substance in pressure chamber 10 is sucked into the same in such a way that pump chamber 16 is completely filled. During the first use of piston pump 1, when the latter contains no active substance, i.e. is filled with air, by means of one or a few pump strokes the air located in the pump can be discharged in the described manner and the pump can be filled with active substance.

In FIGS. 3 and 4, the corresponding parts carry the same reference numerals as in FIGS. 1 and 2, but "a" has been added thereto.

In the embodiment according to FIGS. 3 and 4, the presuction piston 9a, piston pump 18a and piston shaft 20a are formed by a single one-piece component. Path 17a of chamber body 12a is equally wide up to its open end and in the represented embodiment is cylindrical and is provided with longitudinal slots 41 in its associated end 19a and which during the corresponding portion of the pump and return stroke through the packing lip 24a of pump piston 18 are freed so that the pump chamber 16a is opened towards the pressure chamber 10a. As soon as the packing lip 24a has passed over the longitudinal slots 41 during the pump stroke, pump chamber 16a is closed in pressure-tight manner.

Valve 36a is constructed in a simple manner as a so-called hose valve, having a hose-like, elastic portion 37a of the piston shaft 20a surrounding a spherical valve body 38a with pretension. From the engagement position on valve body 38a, the inner face of portion 37a tapers conically in acute-angled manner towards pump chamber 16a, whereas towards the other side, i.e. in the discharge direction has constant cross-sections and passes into a support member 42 for valve body 38a provided with passages, so that on opening and closing valve 36a, body 38a performs no axial movements. As a result a valve 36a is obtained, which only comprises two parts, which can be manufactured in simple manner with adequate manufacturing tolerances even if the piston pump 1a is very small. Here again, the pump travel is clearly defined by the engagement of pump piston 18a on bottom 15a, so that precisely dosed quantities can be discharged. On exceeding the closing pressure of valve 36a, portion 37a is widened counter to its radially inwardly directed pretension, so that an annular passage gap is fred round the valve body 38a through which the active substance can pass into discharge duct 35a.

What is claimed is:

1. A piston pump for media dispensers for repeatably discharging a medium such as pharmaceutical products and the like, said pump comprising:
   a pump piston guided in a pump cylinder from a starting position along a pump stroke to an advanced end position and along a return stroke back to the starting position;
   a pump chamber associated with the pump piston, said pump chamber on one hand being connected by an inlet to a suction duct provided for sucking the medium from a medium reservoir and on the other hand being connected to a discharge duct, the pump chamber being defined by a cup-shaped chamber body;
   a second piston, provided to move together with the pump piston, and being constructed as a presuction piston for filling the pump chamber; and,
   a suction chamber associated with the second piston, the suction chamber being connected to a duct leading to the medium reservoir and being open over the return stroke to said duct, wherein the chamber body is arranged to define a wall clearance with the suction chamber, the suction chamber having a shoulder-like inner surface, inner surface of the suction chamber by an annular flange projecting over a circumference of the chamber body and having at least one passage opening, and wherein one of said ducts is closable by a valve responsive to differential pressure, means being provided for on one hand keeping the inlet of the pump chamber only open towards the suction duct during a short suction portion of the return stroke of the pump piston adjacent the starting position, and for on the other hand over a main part of the pump stroke keeping the discharge duct closed.

2. A pump according to claim 1, wherein the presuction piston runs in the same direction as the pump piston and the suction chamber and pump chamber are commonly under pressure during the pump stroke.

3. A pump according to claim 1, wherein the presuction piston and the pump piston are arranged axially to one another in rigidly positioned manner on a common piston shaft or the like containing the discharge duct.

4. A pump according to claim 1, wherein, in the starting position, the pump piston opens the opened end of the pump chamber in the manner of a slide control.

5. A pump according to claim 4, wherein at least the open end of the pump chamber is located in the section chamber and is connected via the latter to the suction duct.

6. A pump according to claim 4, wherein the open end of the pump chamber is conically widened.

7. A pump according to claim 4, wherein the open end of the pump chamber is provided with longitudinal slots.

8. A pump according to claim 4, wherein the pump chamber is closed on all sides except at the open end of the pump chamber.

9. A pump chamber according to claim 1, wherein the chamber body is cup-shaped body.

10. A pump according to claim 1, wherein the chamber body is located completely in the suction chamber and is equiaxial thereto.

11. A pump according to claim 1, wherein the pump chamber as a separate part is aligned in positionally stable manner on an inner face of the suction chamber.

12. A pump according to claim 1, wherein the duct leading from the suction chamber to the reservoir is formed by the suction duct of the pump chamber.

13. A pump according to claim 1, wherein the presuction piston has a larger piston cross-section than the pump piston.

14. A pump according to claim 1, wherein the chamber body has a bottom, the annular flange being located in a plane of the bottom of the chamber body.

15. A pump according to claim 1, wherein the presuction piston and the pump piston are successively located in a pump casing.

16. A pump according to claim 15, wherein the pump piston is nearer to the suction duct than the presuction piston.

17. A pump according to claim 15, wherein the pump casing surrounds the suction chamber, one end of said pump casing passing into the suction duct and the other end being closed by a casing cap traversed by the piston shaft.

18. A pump according to claim 1, wherein the presuction piston and the pump piston are spring-loaded towards the starting position by a single common return spring.

19. A pump according to claim 1, wherein the return spring surrounds the chamber body in the form of a helical compression spring or the like and presses the chamber body against the shoulder-like inner surface.

20. A pump according to claim 18, wherein the return spring supportedly engages on the presuction piston.

21. A pump according to claim 1, wherein the valve is constructed as a pressure relief valve associated with the discharge duct.

22. A pump according to claim 1, wherein the valve is located in the vicinity of the pump piston.

23. A pump according to claim 1, wherein the valve comprises two valve parts movable against one another, one of the two valve parts being formed by a portion of the pump piston.

24. A pump according to claim 1, wherein the pump piston has a compression sleeve forming an associated piston packing lip in the vicinity of the first end and bounding the discharge duct in a corresponding zone on an outer circumference, said compression sleeve being mounted on the piston shaft in the vicinity of a second end and forming on an inner circumference and annular valve closing part associated with a valve seat on the piston shaft.

25. A pump according to claim 1, wherein the valve is formed by a hose valve.

26. A pump according to claim 25, wherein the valve is formed by an elastic portion of the piston shaft surrounding a valve body with pretension.

27. A pump according to claim 26, wherein the valve body is a ball.

28. A pump according to claim 1, wherein the presuction piston and pump piston are constructed in one piece.

29. A pump according to claim 1, wherein at least one piston and the piston shaft are constructed in one piece.

30. A pump according to claim 1, wherein at least one piston is made from rubber-elastic plastic.

31. A pump according to claim 1, wherein the chamber body is made in one piece with the pump casing.

* * * * *